United States Patent [19]

Bluestein

[11] 4,287,353

[45] Sep. 1, 1981

[54] PROCESS FOR SYNTHESIZING SILANOL CHAIN-STOPPED FLUOROSILOXANE FLUIDS

[75] Inventor: Ben A. Bluestein, Schenectady, N.Y.

[73] Assignee: General Electric Company, Waterford, N.Y.

[21] Appl. No.: 92,800

[22] Filed: Nov. 9, 1979

[51] Int. Cl.$^3$ .............................................. C07P 7/08
[52] U.S. Cl. ................................................... 556/459
[58] Field of Search ........................................ 556/459

[56] References Cited

U.S. PATENT DOCUMENTS

| | | | |
|---|---|---|---|
| 2,863,897 | 12/1958 | Wehrly | 556/459 |
| 3,373,138 | 3/1968 | Brown | 556/459 X |
| 3,479,320 | 11/1969 | Bostick | 556/459 X |
| 3,853,932 | 12/1974 | Razzano | 556/459 |
| 4,075,169 | 2/1978 | Razzano | 556/459 X |

FOREIGN PATENT DOCUMENTS 238780  11/1974  U.S.S.R. .................................. 556/459

Primary Examiner—Paul F. Shaver
Attorney, Agent, or Firm—Michael J. Doyle; John L. Young; Philip L. Schlamp

[57] ABSTRACT

A method for producing silanol chain-stopped fluoroalkyl polysiloxane fluids is disclosed. Fluoroalkyl substituted cyclic trisiloxanes are reacted with water, a catalyst and a polyethyleneglycol ether promoter to produce a fluorosilicone polymer of the desired molecular weight and viscosity.

11 Claims, No Drawings

PROCESS FOR SYNTHESIZING SILANOL CHAIN-STOPPED FLUOROSILOXANE FLUIDS

BACKGROUND OF THE INVENTION

This invention relates to a process for synthesizing silanol chain-stopped polysiloxane fluids and is particularly related to a process for producing silanol chain-stopped fluorosilicone polymers.

Fluorosilicone compositions offer unique properties which perform well in hostile environments and meet such industrial requirements as fuel and solvent resistance. Fluorosilicones retain all the inherent temperature stability and good electrical and thermal properties of other silicones and remain strong, resilient and flexible at high and low temperature extremes where many organic elastomers fail. Fluorosilicone polymers can impart these advantages to otherwise conventional silicone products such as greases and hydraulic fluids. Fluorosilicone gums can be made into fluorosilicone rubbers of both the heat cured, and room temperature vulcanizable varieties. Cured fluorosilicone elastomers will then exhibit the aforementioned desirable properties such as solvent resistance.

Among the many possible fluoro-substituted diorganopolysiloxane compositions, it has been found that silanol chain-stopped fluoroalkylpolysiloxanes are particularly useful and valuable silicone fluids. Among these, the silanol stopped methyl trifluoropropyl polysiloxane fluids are especially valuable.

The present invention provides a novel process for producing such fluids in high yield while minimizing the production of undesirable byproducts such as volatile cyclic siloxanes. Such fluorosilicone fluids are normally utilized in either of two ways. Silanol chain-stopped fluorosiloxane polymers can be a basic ingredient in a condensation-cure fluorosilicone RTV-type product. On the other hand, as described in my copending application filed concurrently herewith, these silanol chain-stopped fluorosiloxane polymers can be treated with trimethylchlorosilane to produce a trimethyl chain-stopped fluoro-substituted dialkyl polysiloxane. This product is known as an M-stopped fluorosilicone fluid and forms the basis for many fluorosilicone products such as greases and hydraulic fluids.

A previous attempt to produce silanol chain-stopped fluorosilicone polymers is described in U.S. Pat. No. 3,373,138, issued Mar. 12, 1968, to E. D. Brown, wherein linear and branched fluoroalkylpolysiloxanes are produced through the hydrolysis of halosilanes with a goal of avoiding the production of cyclic polysiloxanes. This is to distinguish from the present invention wherein silanol chain-stopped fluorosilicone polymers are produced directly from fluoro-substituted diorgano-trisiloxanes rather than from halosilanes.

Alternatively, U.S.S.R. No. 238,780, Yuzhelevskii et al, patented July 8, 1965 and published Oct. 3, 1973, claims to provide a method for obtaining 3,3,3-trifluoropropyl polysiloxane diols by polymerizing 1,3,5-trimethyltris-(3,3,3-trifluoropropyl)-cyclotrisiloxane in the presence of water, a sodium hydroxide catalyst and a nitrogen and oxygen containing activating additive, such as for instance, nitriles or amides of acids, ketones, cyclic and linear ethers and cyanalkylsiloxanes. The disclosure, however, only teaches the use of acetone or cyanoalkyl (methyl) dichlorosilane in the production of polysiloxane diols and does not demonstrate that polysiloxane diols can be obtained in high yield with the use of a polyethylene glycol dimethyl ether type promoter.

In my copending application, Ser. No. 959,544, filed Nov. 13, 1978, Bluestein et al, which is hereby incorporated by reference, it is further shown that fluorosilicone polymers can be formed by reacting a cyclic siloxane trimer containing fluorine substituted hydrocarbon radicals with a low molecular weight, silanol chain-stopped polydiorganosiloxane in the presence of a basic catalyst. That application, however, is fundamentally different from the present invention wherein silanol chain-stopped fluorosilicone fluids are produced.

It is therefore an object of the present invention to provide a process for producing a silanol chain-stopped fluoro-substituted diorganopolysiloxane fluid and particularly a silanol chain-stopped methyltrifluoropropylsiloxane polymer.

SUMMARY OF THE INVENTION

The present invention provides a process for producing a silanol chain-stopped fluorosilicone fluid such as methyltrifluoropropylsiloxane and comprises the steps of reacting 100 parts by weight of a cyclic trimer polysiloxane such as methyltrifluoropropylsiloxane or a mixture of cyclic trimers with a mixture of, approximately, 0.02 to 5.0 parts water and approximately, 0.0050 to 0.1 parts of a polymerization catalyst. The process of the present invention is effectively promoted by the addition of, approximately, 0.010 to 2.0 parts polyethyleneglycol dimethyl ethers having a general formula: $CH_3O(CH_2CH_2O)_nCH_3$ wherein n is an integer from 1 to 4 or more. Examples of effective promoters include triethyleneglycol dimethyl ether, diethyleneglycol dimethyl ether and dimethoxyethane. The reaction is best carried out with moderate heat at from approximately, 25° C. to 100° C. for an amount of time effective for producing a fluorosiloxane fluid having a desired viscosity which is normally in the range of about 50 to 2,000,000 centipoise at 25° C. The polymerization catalyst can be an alkali metal hydroxide or a quaternary ammonium hydroxide. Among the more suitable polymerization catalysts are KOH and NaOH. The polymerization reaction is stopped by adding an effective amount of a neutralizer, which may be selected from the group consisting of aqueous or anhydrous hydrochloric acid, silyl phosphate, tris(chloroethyl)phosphite and trimethylchlorosilane. The reaction can be allowed to proceed from as little as a half hour to ten hours or more or depending upon the molecular weight and viscosity desired for the final polymer.

The cyclic siloxanes utilized as the starting materials in the present invention have the following general formula:

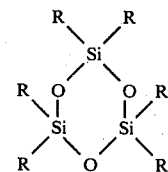

wherein R is a monovalent substituted or unsubstituted hydrocarbon radical, including lower alkyl and aryl organic radicals and olefin-unsaturated radicals. Specific examples of R include $CH_3-$, $F_3CCH_2CH_2-$, and $C_6H_5-$, etc. and it is contemplated that R can be the same or a combination of these substituents. Although many of the examples described below start with methyltrifluoropropylsiloxane cyclic trimer, it is to be understood that the process of the present invention can also be efficiently carried out by utilizing mixtures of said cyclic trimers covered by the general formula described above.

Ordinarily, the cyclic trimer utilized in the present process is methyltrifluoropropylsiloxane cyclic trimer having the following general formula:

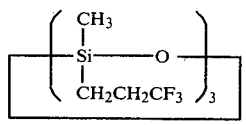

It is known in the art of fluorosilicone and organosilicone chemistry that cyclic trisiloxanes react more readily than corresponding cyclic tetrasiloxanes in the formation of polymers. Fluorocarbon substituted cyclic trisiloxanes can be polymerized with a basic catalyst and effective amounts of triorganosiloxy chain-stopped polymers having a low molecular weight at elevated temperatures inorder to form a desired diorganopolysiloxane polymer.

DESCRIPTION OF THE PREFERRED EMBODIMENT

When the cyclic trimer of methyltrifluoropropylsiloxane is mixed with water and a base such as sodium hydroxide or potassium hydroxide, little or no reaction occurs at, or slightly above, room temperature. If, however, a suitable promoter is added to the reaction mixture an exothermic reaction ensues. This reaction results in the formation of a silanol-stopped fluorosilicone polysiloxane.

A number of suitable promoters of this reaction have been found. These are polyethylene glycol dimethyl ethers such as triethyleneglycol dimethyl ether, diethyleneglycol dimethyl ether, and dimethoxyethane.

Of these, however, triethyleneglycol dimethyl ether is preferred since it gives the fastest rate of polymerization consistent with the lowest amount of volatile cyclic siloxanes produced in the reaction. The concentration of byproduct cyclic siloxanes increases as the temperature, time and amounts of catalyst and promoter are increased. Since high levels of cyclics are considered detrimental, the catalyst must be neutralized as soon as the desired fluid viscosity is attained. Normally, any acid effective for neutralizing the basic catalyst will be acceptable. Such neutralizing agents can therefore include phosphoric acid, acetic acid, aqueous or anhydrous hydrochloric acid, trimethylchlorosilane, tris(chloroethyl) phosphite or its partial hydrolyzate, or a silyl phosphate solution, which is particularly effective because it is quite soluble in siloxane polymers and allows for rapid neutralization. The expression "silyl phosphate" refers to a dimethyl polysiloxane containing phosphoric acid groups which is made by heating a mixture of 85% phosphoric acid, dimethylsilicone tetramer and hexamethyldisiloxane until the mixture is homogeneous and no water evolves, thus forming a siloxane soluble form of phosphoric acid. See for example, the patent application of Razzano et al, Ser. No. 854,562, filed Nov. 25, 1977, which discloses the use of silyl phosphate as a neutralizing agent. An advantage of using silyl phosphate is that it is a buffering agent as well as an acidic neutralizing agent so that back-titration is not necessary to reach a substantially neutral level in the polymerization mixture. It should be noted that utilization of this procedure can produce a polymer having desirably low levels of volatile or cyclic polysiloxanes in the equilibrium mixture.

Suitable basic catalysts include alkali metal hydroxides such as cesium hydroxide, potassium hydroxide, sodium hydroxide, lithium hydroxide and their analogs cesium silanolate, potassium silanolate, sodium silanolate and lithium silanolate. These several catalyzing agents offer varying relative reactivities with respect to the present polymerization process and may be selected according to desired process parameters. For example, sodium hydroxide is a weaker base than potassium hydroxide and catalyzes the polymerization relatively more slowly than the latter and therefore the reaction takes longer at any given temperature. The various silanolate analog bases offer the advantage of relatively greater solubility in the starting materials, however, less soluble catalysts such as potassium hydroxide are perfectly acceptable when process conditions are adjusted for its use as for example by providing agitation of the reaction materials. As long as there is sufficient time to dissolve the potassium hydroxide in the cyclic trimer reaction mixture it is an acceptable catalyst.

In applying the present invention to the synthesis of silanol chain-stopped siloxane polymers from the methyltrifluoropropylsilicone trimer, the amounts of the reagents and the experimental conditions must be carefully controlled, since each will interact. The amount of water utilized is partially but not completely dependent upon the viscosity of the desired fluid. Amounts of water can range from less than 0.02% to over 5% of the cyclic trimer. The amount of the basic catalyst can be from below 100 ppm to over 1,000 ppm. The level of the promoter can be from about less than 100 ppm to more than 20,000 ppm.

The temperature at which the polymerization reaction may be carried out should not exceed approximately 75° C., but can be as low as, approximately, room temperature or 25° C., depending upon the catalyst-promoter combination chosen and the desired viscosity and volatility of the end product. Additionally, of course, the length of time the reaction is allowed to proceed will influence the final properties of the product.

In the following examples, the term "volatility" refers to the measure of low molecular weight material (cyclic trimer, tetramer or pentamer and low molecular weight silanols) in the silanol-stopped linear silicone fluid product and is measured as the percent weight loss when a sample is heated for 1 hour at 135° C. and 15 mm vacuum.

EXAMPLE 1

A reactor equipped with a thermometer, stirrer, condenser and addition port was kept in a constant temperature bath. Charged to the reactor were 3,500 grams of methyltrifluoropropylsilicone trimer. The temperature of the reaction mixture was raised to 35° C. and a solution consisting of 0.34 grams solid KOH, 21 grams of water and 1.2 grams of triethyleneglycol dimethyl ether was added all at once. During the course of the subsequent 3 hours the temperature rose to 51° C. and then fell to 43° C. while the viscosity slowly increased. The polymerization was then stopped by adding 4.2 grams of a silicone phosphoric acid reaction product. The final viscosity was measured to be 1360 centistokes and the fluid had a volatility of 1.4%.

EXAMPLE 2

The reaction vessel contained 1,000 grams trimer, to which was added a solution consisting of 20 grams water, 0.2 grams KOH and 0.6 grams triethyleneglycol dimethyl ether. The reaction ran for 3.5 hours, during which time the temperature rose to 42° C. and then fell to 35° C. whereupon a silicone phosphoric acid reaction product was added to stop the polymerization. The fluorosilicone fluid produced therein, had a viscosity of 420 centistokes and a volatility of 2.6%.

EXAMPLE 3

The following three fluids were produced in accordance with Example 1. To each of three samples of 1,000 grams methyltrifluoropropylsiloxane trimer was added a solution consisting of the designated amounts of water, base and promoter. The reaction was allowed to proceed for the time indicated at the designated temperature. The resulting products had viscosities and volatilities as listed in Table A.

TABLE A

| Sample* | H$_2$O | Base | Promoter** | Temp./Time | Viscosity | Volatility |
|---|---|---|---|---|---|---|
| 3(a) | 20 g | 0.2 g KOH | 0.6 g | 35°–42°/3.5 hr | 420 cs | 2.6% |
| 3(b) | 2.5 g | 0.1 g KOH | 0.24 g | 35°–52°/3 hr | 10,800 cs | 1.4% |
| 3(c) | 2.0 g | 0.2 g KOH | 0.2 g | 48°/3 hr | 63,360 cs | 4.0% |

*1000 g each of methyltrifluoropropylsilicone trimer
**triethyleneglycol dimethyl ether

EXAMPLE 4

The polymerization reaction of the present invention was carried out utilizing sodium hydroxide as the catalyst as shown in Table B, wherein two samples of 2,000 grams each of methyltrifluoropropylsiloxane trimer were reacted to yield the indicated silanol-stopped fluorosiloxane fluids.

TABLE B

| Sample* | H$_2$O | Base | Promoter** | Temp./Time | Viscosity | Volatility |
|---|---|---|---|---|---|---|
| 4(a) | 10 g | 3.0 g NaOH | 1.0 g | 35°–39°/6 hr | 6,800 cs | 1.4% |
| 4(b) | 6 g | 2.0 g NaOH | 1.4 g | 35°–40°/5.5 hr | 18,800 cs | — |

*2000 g methyltrifluoropropylsilicone trimer
**triethyleneglycol dimethyl ether

EXAMPLE 5

As a means for comparing the effectiveness of the promoters utilized by the present invention, 1,000 grams of the fluorosilicone trimer was added to 6 grams water and 0.1 grams KOH as a base. In this Example, 0.3 grams acetone was utilized as the promoter and after 3 hrs. at 40° C., no reaction was visible. The reaction temperature was then raised to 85° C. for an additional 1.5 hrs. whereupon a product having a viscosity of 790 centistokes was obtained. This product had a volatility of 8.1%.

EXAMPLE 6

Other promoters contemplated by the present invention are also effective. For example, 1,000 grams of the fluorosilicone trimer was added to 6.0 grams of water and 0.1 grams KOH base. Then, 0.33 grams of dimethoxyethane was utilized as the promoter. The reaction mixture was maintained at a temperature between 35° and 45° C. for 2 hrs. and no reaction was obtained, but when the mixture was heated for one additional hour at a temperature of 85° to 95° C. a product having a viscosity of 10,260 centistokes and a volatility of 3.8% was obtained.

EXAMPLE 7

To 1,000 grams of the fluorosilicone trimer was added 2.5 grams of water and 0.1 grams KOH base. In this Example, 0.25 grams of diethyleneglycol dimethyl ether was utilized as the promoter. No reaction was obtained after 2½ hrs. at 36° C., however, when the temperature was raised to 64° C. for an additional 2 hrs., a viscous product having a volatility of 2.5% was obtained.

EXAMPLE 8

A mixture of 468 grams methyl-trifluoropropylsiloxane cyclic trimer, 148 grams dimethylsiloxane cyclic trimer and 2.9 grams water was stirred and warmed to a temperature of 54° C. To this mixture a solution of 1.9 grams of 4% aqueous potassium hydroxide and 0.26 grams of triethyleneglycol dimethyl ether was added. After 40 minutes the temperature had risen to 76° C. and the originally cloudy mixture had become a clear solution. The temperature was maintained between 65° to 81° C. for an additional 2 hours and a viscous solution was obtained, whereupon 1.6 cc silyl phosphate was added and the mixture was stirred at 65° C. for another 2 hours. The resulting product had a viscosity of 20,800 centistokes and volatility of 6.7%. Infrared analysis revealed the presence of dimethylsiloxy groups, and trifluoropropylmethylsiloxy groups as well as silanol groups.

What is claimed as new and desired to be protected by Letters Patent of the United States is:

1. A process for producing a silanol chain-stopped fluorosilicone fluid, comprising: reacting at 25° C. to 100° C., 100 parts by weight of a cyclic fluorosiloxane trimer with a mixture of, approximately, 0.02 to 5.0 parts water and, approximately, 0.0050 to 0.10 parts polymerization catalyst and, approximately, 0.010 to 2.0 parts of polyethyleneglycol dimethyl ether promoter and adding an amount of neutralizer effective for stopping the polymerization at the desired viscosity.

2. A process as in claim 1, wherein said cyclic fluorosiloxane trimer has the general formula,

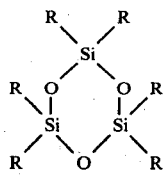

wherein R is a monovalent substituted or unsubstituted hydrocarbon radical, including lower alkyl and aryl organic radicals and olefinic-unsaturated radicals and mixtures thereof and at least one R is a trifluoropropyl radical.

3. A process as in claim 2, wherein said cyclic fluorosiloxane trimer is methyltrifluoropropylsiloxane having the formula:

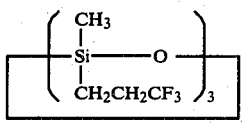

4. A process as in claim 1, wherein said polyethyleneglycol dimethyl ether promoter is selected from the group consisting of triethyleneglycol dimethyl ether, diethyleneglycol dimethyl ether, and dimethoxyethane.

5. A process as in claim 4, wherein said polyethyleneglycol dimethyl ether promoter is triethyleneglycol dimethyl ether.

6. A process as in claim 1, wherein said polymerization catalyst is an alkali metal hydroxide or a quaternary ammonium hydroxide.

7. A process as in claim 6, wherein said alkali metal hydroxide is KOH or NaOH.

8. A process in claim 1, wherein said neutralizer is selected from the group consisting of aqueous or anhydrous hydrochloric acid, silyl phosphate, tris(chloroethyl)phosphite and trimethylchlorosilane.

9. A process as in claim 2, wherein said polymerization reactions proceeds for an amount of time effective for producing a diorganopolysiloxane fluid having a desired viscosity in the range of about 50 to 2,000,000 centipoise at 25° C.

10. A process as in claim 3, wherein said polymerization reaction proceeds for an amount of time effective for producing a methyltrifluoropropylsiloxane fluid having a desired viscosity in the range of about 50 to 2,000,000 centipoise at 25° C.

11. A process for producing a silanol chain-stopped fluorosilicone fluid, comprising: reacting at 25° C. to 100° C., 100 parts by weight of a mixture of at least one type of fluoro-substituted cyclotrisiloxane and one or more types of trisiloxanes selected from the group consisting of dimethylsilicone cyclic trimer, methylvinylsilicone cyclic trimer, methylphenylsilicone cyclic trimer, and diphenylsilicone cyclic trimer; with a mixture of, approximately, 0.02 to 5.0 parts water and, approximately, 0.0050 to 0.10 parts polymerization catalyst and, approximately, 0.010 to 2.0 parts of polyethyleneglycol dimethyl ether promoter and adding an amount of neutralizer effective for stopping the polymerization at the desired viscosity.

* * * * *